US012587617B1

(12) United States Patent
Bowman et al.

(10) Patent No.: US 12,587,617 B1
(45) Date of Patent: Mar. 24, 2026

(54) OPTIMIZING DATA FOR VEHICLES WITH MULTIPLE RADIOS

(71) Applicant: AeroVironment, Inc., Simi Valley, CA (US)

(72) Inventors: William S. Bowman, Melbourne, FL (US); Andrew D. Falendysz, Grant, FL (US); Sean R. Wagoner, West Melbourne, FL (US); Mark B. Moffett, Grant, FL (US)

(73) Assignee: Aero Vironment, Inc., Simi Valley, CA (US)

( * ) Notice: Subject to any disclaimer, the term of this patent is extended or adjusted under 35 U.S.C. 154(b) by 0 days.

(21) Appl. No.: 19/007,377

(22) Filed: Dec. 31, 2024

(51) Int. Cl.
| | |
|---|---|
| *H04N 7/18* | (2006.01) |
| *B64C 39/02* | (2023.01) |
| *B64U 101/30* | (2023.01) |
| *G06V 10/25* | (2022.01) |
| *G06V 10/74* | (2022.01) |

(52) U.S. Cl.
CPC ........... *H04N 7/185* (2013.01); *B64C 39/024* (2013.01); *G06V 10/25* (2022.01); *G06V 10/74* (2022.01); *B64U 2101/30* (2023.01)

(58) Field of Classification Search
CPC ...... H04N 7/185; B64C 39/024; G06V 10/25; G06V 10/74; B64U 2101/30
See application file for complete search history.

(56) References Cited

U.S. PATENT DOCUMENTS

| | | | | |
|---|---|---|---|---|
| 2004/0156354 A1* | 8/2004 | Wang | .................... | H04W 28/00 370/352 |
| 2012/0072990 A1* | 3/2012 | Gutt | .................. | G06Q 10/0635 726/25 |
| 2018/0254825 A1* | 9/2018 | Speidel | .................... | H04B 7/19 |
| 2023/0075589 A1* | 3/2023 | Zhang | .................... | H04W 24/04 |
| 2024/0080748 A1* | 3/2024 | Bergström | .............. | G08G 5/55 |
| 2024/0212508 A1* | 6/2024 | Orsino | ..................... | G08G 5/56 |

FOREIGN PATENT DOCUMENTS

| | | | | |
|---|---|---|---|---|
| CA | 2762683 A1 * | 6/2012 | .......... | H04L 65/756 |
| WO | WO-2024213283 A1 * | 10/2024 | .............. | H04W 8/18 |

\* cited by examiner

*Primary Examiner* — Michael Lee
(74) *Attorney, Agent, or Firm* — Perkins Coie LLP

(57) ABSTRACT

Methods and systems are described herein for optimizing how recorded data frames are processed and stored when a recording device (e.g., mounted upon an uncrewed vehicle) is within a non-transmit zone. A determination may be made that a non-transmit zone has been entered, and the current network conditions may be evaluated, including available bandwidth and/or latency for each radio. The data frames may be split into queues associated with the radios on board the vehicle based on the frame size and network conditions. This mechanism may ensure efficient use storage space in preparation for data transmission.

20 Claims, 6 Drawing Sheets

*800*

Record a data stream on board a vehicle
602

Detect that the vehicle has crossed into a non-transmit zone
604

Periodically determine, for each radio, a corresponding bandwidth
606

Periodically assign a corresponding portion of the plurality of data frames into a corresponding queue
608

Based on determining that a bandwidth ratio of two radios has changed by more than a threshold, switch queue assignments between the two radios
610

Based on detecting that the vehicle left the non-transmit zone, transmit data frames from the plurality of queues
612

100

200

| Radio ID | Throughput | Queue |
|----------|------------|-------|
| 120 | 1 MBPS | Queue 1 |
| 130 | 7 MBPS | Queue 2 |
| 140 | 3 MBPS | Queue 3 |

203  206  209

220

| Radio ID | Throughput | Queue |
|----------|------------|-------|
| 120 | 6 MBPS | Queue 2 |
| 130 | 1 MBPS | Queue 1 |
| 140 | 3 MBPS | Queue 3 |

| Radio ID | Network Params | Change in Ratio |
|----------|----------------|-----------------|
| 120 | Bandwidth Ratio 130: 3/1<br>Bandwidth Ratio :140 6/1 | 1x<br>1x |
| 130 | Bandwidth Ratio 120: 1/3<br>Bandwidth Ratio 140: 2/1 | 1x<br>1x |
| 140 | Bandwidth Ratio 120: 1/6<br>Bandwidth Ratio 130: 1/2 | 3.5x<br>1x |

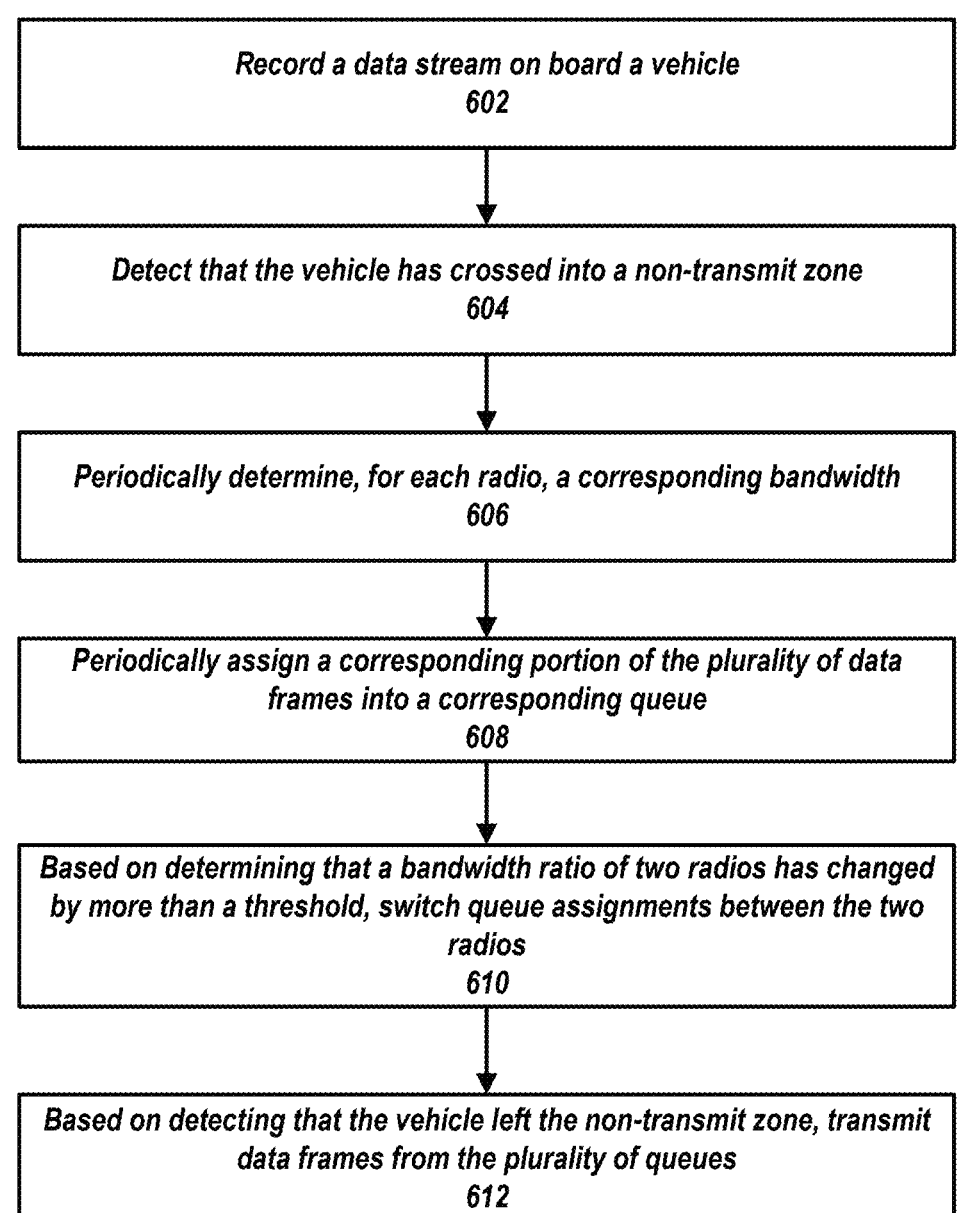

*600*

Record a data stream on board a vehicle
602

Detect that the vehicle has crossed into a non-transmit zone
604

Periodically determine, for each radio, a corresponding bandwidth
606

Periodically assign a corresponding portion of the plurality of data
frames into a corresponding queue
608

Based on determining that a bandwidth ratio of two radios has changed
by more than a threshold, switch queue assignments between the two
radios
610

Based on detecting that the vehicle left the non-transmit zone, transmit
data frames from the plurality of queues
612

FIG. 6

OPTIMIZING DATA FOR VEHICLES WITH MULTIPLE RADIOS

BACKGROUND

Uncrewed systems are becoming increasingly common in various technology fields (e.g., surveillance, environmental monitoring, search and rescue, media production, and others). In many instances, uncrewed systems (e.g., uncrewed aerial vehicles) often record and transmit video to a ground station or control center. Existing technologies for video transmission generally rely on fixed bandwidth allocation and continuous data streaming. However, this may not be optimal in various situations. For example, uncrewed vehicles may be traveling through unfriendly territories where data transmission may be blocked or otherwise unavailable (e.g., to avoid detection). Accordingly, efficient processing and storage of data on board uncrewed systems has become more and more important.

SUMMARY

Therefore, methods and systems are described herein for optimizing a mechanism for data management, thereby optimizing how recorded data (e.g., frames of a video stream) is processed and stored when the system is within a non-transmit zone as determined based on, for example, a mission plan. In some instances, an uncrewed aerial vehicle equipped with a plurality of radios, with some capable of transmitting data over different frequencies or waveforms, may include a transmission optimization system that is used to perform the operations described herein. The transmission optimization system may be deployed on a device being moved in an unfriendly territory (e.g., on an uncrewed aerial vehicle, on a terrain-based vehicle, or on a computing device carried by an operator) where the transmission optimization system may optimize storage, processing, and ultimately transmission of recorded data (e.g., video, sound navigation and ranging (sonar), infrared, etc.).

As the transmission optimization system determines that a non-transmit zone has been entered, the transmission optimization system may periodically evaluate the current network conditions, including available bandwidth and/or latency for each radio in preparation of entering a transmit zone. The transmission optimization system may split the data frames into smaller portions and assign each portion to a queue that is associated with the most suitable radio based on the frame size and network conditions. As more stream data is received, the transmission optimization system may split that stream data into portions and move the stream data into a corresponding queue (i.e., a queue associated with a particular radio). Meanwhile the transmission optimization system may continue to periodically monitor for any changes in bandwidth and/or latency for each radio. Based on detecting that the bandwidth and/or latency ratio for a particular radio has changed more than a threshold ratio, the transmission optimization system may switch the queues associated with those radios. That is, the queue that was associated with a first radio may be assigned to a second radio and the queue that was associated with the second radio may be assigned to the first radio. The transmission optimization system may hold the stream data in the queues until the associated device is within a transmit zone, and then the transmission optimization system may start transmitting the data frames from the queues.

In some embodiments, a computing device (e.g., aboard a vehicle such as an uncrewed aerial vehicle) may be recording a data stream (e.g., video, sonar, infrared, etc.) using a recording device (e.g., camera, sonar array, etc.). The computing device may be moved according to a mission plan that may dictate the uncrewed vehicle's route and objectives, ensuring that the recording device captures relevant areas and/or events. The recorded data stream may serve as the primary data that may be transmitted to a remote device, such as a ground station or control center.

The transmission optimization system may detect when the uncrewed vehicle has crossed into a non-transmit zone. The non-transmit zone may be a predetermined area specified in the mission plan or detected on the fly where data transmission is not feasible, disabled, and/or not allowed. That is, a non-transmit zone is a zone where data transmission is to be terminated. In some embodiments, the non-transmit zone may be selected based on factors such as network coverage, signal strength, and/or operational permissions as dictated by a tactical situation. Furthermore, detection of the device hosting the transmission optimization system within the non-transmit zone may trigger subsequent operations for data stream processing and storage. By detecting the entry into the non-transmit zone, the transmission optimization system may ensure that data transmission occurs only in areas that are optimal (e.g., enabled) and/or secure.

When the transmission optimization system detects that a vehicle (e.g., an uncrewed aerial vehicle) has crossed into a non-transmit zone, the transmission optimization system may store on board the vehicle a data stream being recorded by the vehicle. In some embodiments, the data stream may include a plurality of data frames. For example, when the transmission optimization system determines that the vehicle has entered the non-transmit zone, the transmission optimization system may instruct the radios to terminate transmission and start processing and storing recorded data frames based on the actions described further. In some embodiments, the transmission optimization system may terminate the data transmission and continuously store a video stream being recorded as the uncrewed aerial vehicle moves within the non-transmit zone. As discussed above, the video stream may include a plurality of video frames with each frame having a corresponding frame size.

While in the non-transmit zone, the transmission optimization system may determine network conditions in anticipation of data transmission when a transmit zone is reached. In particular, the transmission optimization system may periodically determine, for each radio of a plurality of radios (e.g., on board the uncrewed aerial vehicle) while within the non-transmit zone, a corresponding bandwidth value or a corresponding latency value for transmitting data to a remote device. The uncrewed aerial vehicle may be equipped with a plurality of radios (e.g., Wi-Fi, cellular, satellite, etc.) capable of transmitting data over different frequencies or waveforms. The transmission optimization system may periodically (e.g., every thirty seconds, every minute, every five minutes, every ten minutes, etc.) use those radios to perform bandwidth and/or latency detection for each radio.

Furthermore, as the transmission optimization system receives recorded data frames, those data frames may split into smaller portions based on a size of the frames and assign those portions to different queues associated with different radios so that those radios are able to transmit the data frames when a transmission zone is entered. In particular, the transmission optimization system may periodically assign, based on a corresponding frame size, a corresponding portion of the plurality of data frames of the data stream into a plurality of queues to be transmitted by each radio of the plurality of radios. Thus, each radio of the plurality of radios may have a corresponding queue of the plurality of queues. For example, an uncrewed vehicle may have three radios on board. Each radio may be assigned a queue that has been previously generated for that particular radio. As the transmission optimization system receives the data frames and/or stores them in memory, the data frames may be assigned to a particular queue based on their sizes. Thus, the data stream may be stored as a set of data frames within the queues.

As the uncrewed vehicle moves through the non-transmit zone, the bandwidth and/or latency associated with each radio may change. In some instances, the changes in bandwidth and/or latency may be so large that the queue (e.g., having large data frames) should be reassigned to another radio. Thus, the transmission optimization system may, based on determining that a bandwidth ratio of bandwidth values or a latency ratio of latency values of two radios of the plurality of radios has changed by more than a threshold, switch queue assignments between the two radios. For example, a first radio may have a bandwidth of nine megabits per second while a second radio may have a bandwidth of two megabits per second. Thus, the first radio may be assigned a queue with large frames while the second radio may be assigned a queue with small frames. However, as the uncrewed vehicle traverses the non-transmit zone, the bandwidth values may change such that the first radio may have much less bandwidth (e.g., two megabits per second) while the second radio may have much more bandwidth (e.g., eight megabits per second). Thus, the transmission optimization system may switch the queue assignments between the first radio and the second radio.

The transmission optimization system may continue the operations above while within the non-transmit zone. That is, the transmission optimization system may keep periodically determining network conditions and periodically assigning data frames to queue, and when the bandwidth values change as discussed above, switch the queues. Thus, when the uncrewed vehicle reaches a transmit zone, the transmission optimization system may try to empty the queues as fast as possible to make room for other data that is being recorded. Thus, the transmission optimization system may, in response to detecting that the vehicle left the non-transmit zone, transmit data frames from the plurality of queues. For example, each radio may transmit assigned portions of the data to a remote device. This mechanism may enhance the reliability and speed of data transmission, ensuring that the data reaches the ground station or control center safely.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates an excerpt of a data structure that may represent radio identifiers and corresponding assigned queues, in accordance with one or more embodiments of this disclosure.

FIG. 4 illustrates a data structure for storing radio information and bandwidth ratio information, in accordance with one or more embodiments of this disclosure.

FIG. 6 is a flowchart of operations for optimizing processing and storage of data, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
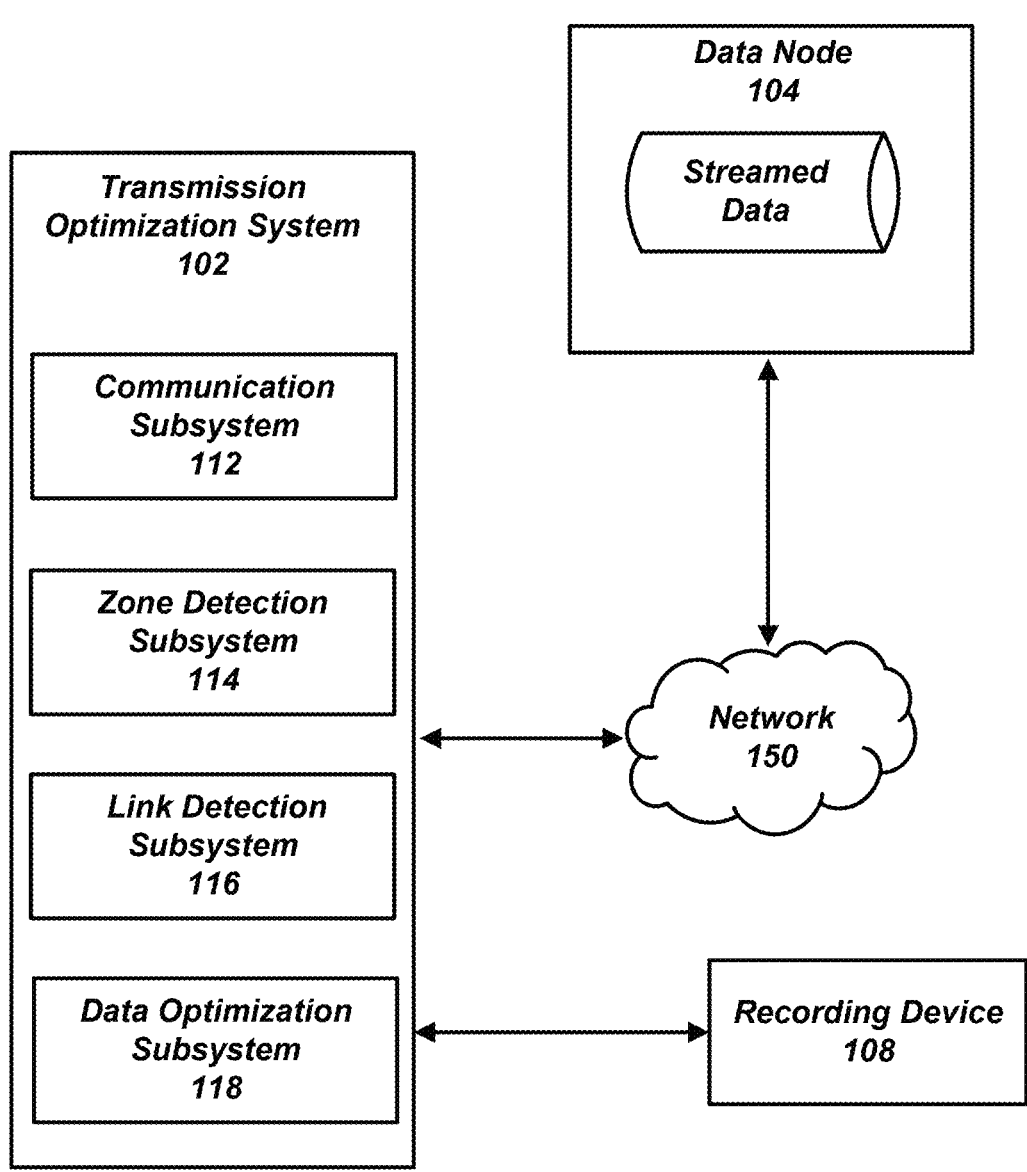
FIG. 1 shows an illustrative system for optimizing processing and storage of data while in a non-transmit zone, in accordance with one or more embodiments of this disclosure.

FIG. 1 is an example of environment 100 for optimizing transmission of data when network properties change due to movement. Environment 100 includes transmission optimization system 102, data node 104, and a recording device 108. Transmission optimization system 102 may execute instructions for optimizing transmission of data. Transmission optimization system 102 may include software, hardware, or a combination of the two. In some embodiments, data node 104 may reside within a command-and-control center where frames are being sent.

Data node 104 may store various data. For example, data node 104 may store image data (e.g., video data) being sent by transmission optimization system 102. In some embodiments, data node 104 may also be used to train machine learning models and/or adjust parameters (e.g., hyperparameters) associated with those machine learning models. Data node 104 may include software, hardware, or a combination of the two. For example, data node 104 may be a physical server or a virtual server that is running on a physical computer system. In some embodiments, data node 104 may reside in a datacenter to be used by commanding officers for situational awareness. Network 150 may be a local area network (LAN), a wide area network (WAN) (e.g., the Internet), or a combination of the two. Recording device 108 may be a device attached to a vehicle (e.g., an uncrewed vehicle) or may be a device that is carried by an operator. Recording device 108 may be a video camera, an infrared camera, a microphone, a thermal imaging device, and/or another suitable device.

Transmission optimization system 102 may be communicating with a command-and-control center. For example, transmission optimization system 102 may be sending image data being captured by a camera mounted onto a vehicle. The vehicle may be wirelessly communicating over a network (e.g., network 150) and may be transmitting image data to data node 104 using communication subsystem 112. Communication subsystem 112 may include software components, hardware components, or a combination of both. For example, communication subsystem 112 may include a network card (e.g., a wired/wireless network card/processor) that is coupled with software to drive the card/processor. The network card may be built into a vehicle or another suitable computing device on board a vehicle or carried by an operator.

In some embodiments, transmission optimization system 102 may be recording data (e.g., a data stream) using a recording device (e.g., recording device 108). In particular, transmission optimization system 102 may be recording a data stream using a recording device, such that the data stream includes a plurality of data frames. In some embodiments, the recording device may be moved according to a mission plan. For example, the mission plan may be a file or a data structure that is loaded onto a computing device on board a vehicle (e.g., an uncrewed vehicle). The recording device may be a video camera, infrared camera, sonar, light detection and ranging (lidar), and/or any other suitable device mounted on an uncrewed vehicle (e.g., mounted onto an uncrewed aerial vehicle, an uncrewed submarine, an uncrewed ground vehicle, or another suitable vehicle) and/or carried by an operator. Transmission optimization system 102 may have a pre-programmed mission plan that dictates the route for the uncrewed vehicle and/or operator. Transmission optimization system 102 may record the data in a particular format (e.g., as a video stream of video frames). For example, the video frames may follow a particular video encoding protocol that is supported by transmission optimization system 102.

In some embodiments, transmission optimization system 102 may detect that the device hosting the transmission optimization system has crossed into a non-transmit zone. In particular, zone detection subsystem 114 may detect that a vehicle (e.g., an uncrewed vehicle) has crossed into a non-transmit zone. The non-transmit zone may be a predetermined zone where data transmission is to be terminated. Zone detection subsystem 114 may include software components, hardware components, or a combination of both. For example, zone detection subsystem 114 may use one or more processors on board an uncrewed vehicle to execute various software instructions.

In some embodiments, the non-transmit zone may be detected on the fly by zone detection subsystem 114. For example, zone detection subsystem 114 may use a map of coordinates to determine friendly and unfriendly territories and may identify transmit zones within friendly territories marked on a map. Furthermore, zone detection subsystem 114 may use the presence of various signals to identify a non-transmit zone. For example, if zone detection subsystem 114 identifies jamming signals, radar signals, or other signals indicative of enemy activity (e.g., signal identifiers stored within a database indicating that transmission should not be allowed), zone detection subsystem 114 may identify a particular zone as a non-transmit zone and may disable transmission. However, where those signals are not present, zone detection subsystem 114 may identify a zone as a transmit zone.

In some embodiments, zone detection subsystem 114 may use a mission plan (e.g., loaded on board a vehicle) to identify a non-transmit zone. In particular, zone detection subsystem 114 may detect, at an uncrewed aerial vehicle, that the uncrewed aerial vehicle has crossed into a non-transmit zone such that the non-transmit zone is a predetermined zone indicated within a mission plan and indicates where data transmission is to be terminated. For example, mission planners may have detailed maps of unfriendly locations and the computing device on the vehicle may receive those maps as an input indicating the unfriendly locations.

In some embodiments, the device hosting transmission optimization system 102 may be carried by an operator, while in some embodiments, the device hosting transmission optimization system 102 may be attached to or built into a vehicle (e.g., an uncrewed aerial vehicle). Thus, the transmit zone maps (e.g., indicating transmit zones and non-transmit zones) may be of different granularity (e.g., based on a maximum velocity that may be achieved by the device hosting the transmission optimization system) for an aerial vehicle, for a ground vehicle, and for an operator. In some embodiments, zone detection subsystem 114 may determine the transmit zone using GPS coordinates, radio frequency identification, geofencing, or other location-based services integrated into transmission optimization system 102. In some embodiments, upon entering a non-transmit zone, zone detection subsystem 114 may trigger subsequent operations for data processing and storage optimization.

In some embodiments, zone detection subsystem 114 may terminate all data transmission in response to determining that a vehicle has crossed into a non-transit zone. In particular, zone detection subsystem 114 or another suitable subsystem may, in response to determining that the uncrewed aerial vehicle has crossed into the non-transmit zone, terminate all or at least some data transmission from the uncrewed vehicle. Zone detection subsystem 114 may also generate a command to continuously process a video stream being recorded as the vehicle (e.g., uncrewed aerial vehicle) moves within the non-transmit zone. In some embodiments, the video stream may include a plurality of video frames with each frame having a corresponding frame size. Processing of video streams will be described later in this document.

In some embodiments, zone detection subsystem 114 may, based on detecting that the device hosting transmission optimization system 102 has been moved into a non-transmit zone, generate an indication to link detection subsystem 116 for performing bandwidth and/or latency detection. Link detection subsystem 116 may include software components, hardware components, or a combination of both. For example, link detection subsystem 116 may use one or more processors on board an uncrewed vehicle to execute various software instructions. In particular, link detection subsystem 116 may periodically determine, for each radio of a plurality of radios while within the non-transmit zone, a corresponding bandwidth value and/or a corresponding latency value for transmitting data to a remote device. Link detection subsystem 116 may use available networking monitoring tools for bandwidth and/or latency detection.

In some embodiments, link detection subsystem 116 may continuously monitor network conditions (e.g., of network 150) using software algorithms that may assess the available bandwidth and/or latency for each radio. That is, in some embodiments, link detection subsystem 116 may periodically (e.g., at a particular time interval) determine a bandwidth (e.g., a number of megabits/megabytes) available for sending data without taking latency into account. However, in some embodiments, link detection subsystem 116 may determine both bandwidth and latency. Link detection subsystem 116 may use metrics such as signal-to-noise ratio, error rate, and current network traffic to determine available bandwidth and/or latency for each radio. This periodic assessment may ensure that the transmission optimization system 102 adapts to changing network conditions in real time in preparation for data transmission when the vehicle exits the non-transmit zone.

In some embodiments, link detection subsystem 116 may be hosted on a device that is mounted onto a vehicle that has been determined to cross into a non-transmit zone. Thus, based on detecting that the vehicle has crossed into the non-transmit zone, link detection subsystem 116 may periodically determine, for each radio of a plurality of radios on board the vehicle as the vehicle moves through the non-transmit zone, a corresponding bandwidth for transmitting data to a remote device. For example, transmission optimization system 102 may be receiving encoded video from a camera on board the vehicle. The video may include full frames (e.g., known as I-frames) and partial frames, such as pixel differential from a full frame (e.g., known as P-frames or B-frames). The I-frames may be large in size in comparison to P-frames or B-frames because they contain a large number of pixels as compared to the other types of frames. Accordingly, those frames may need to be sent over a radio or radios having larger bandwidth values and/or lower latency values.

In some embodiments, as link detection subsystem 116 determines the bandwidth and/or latency for all the available radios, data optimization subsystem 118 may perform queue assignment operations. Data optimization subsystem 118 may include software components, hardware components, or a combination of both. In particular, data optimization subsystem 118 may periodically assign, based on a corresponding frame size, a corresponding portion of the plurality of data frames of the data stream into a corresponding queue of a plurality of queues to be transmitted by each radio of the plurality of radios. Furthermore, each radio of the plurality of radios may have a corresponding queue of the plurality of queues.

In some embodiments, an uncrewed vehicle may have three different radios on board. Each radio may have an assigned queue based on bandwidth, with each queue having a corresponding range of bandwidth. For example, a first queue may be associated with bandwidth from zero megabits per second to one and one-half megabits per second, a second queue may be associated with bandwidth of one and one-half megabits per second to five megabits per second, and a third queue may be associated with a bandwidth of five megabits per second and higher. Additionally or alternatively, each queue may be associated with a particular range of frame sizes. The range may be dynamic or static. That is, the received data frames may be placed into one of the queues based on frame size. The assignment of data frames may be periodically or as the frames are received. For example, the assignment of frames may be performed every ten seconds, thirty seconds, one minute, or at another suitable interval. In another example, the assignment of frames may be performed as the frames are received from a recording device (e.g., a camera).

FIG. 2 illustrates a data structure 200 that stores radio identifiers and corresponding throughput and queue information. Data structure 200 may include an entry per radio with field 203 storing an identifier associated with the radio, field 206 storing a last detected throughput associated with a corresponding radio, and field 209, which includes a corresponding queue identifier that is linked to each radio. Link detection subsystem 116 may update fields 206 periodically as new bandwidth and/or latency values are detected during network analysis. Thus, data optimization subsystem 118 may assign data frames (e.g., video frames) to each queue, based on frame size, periodically (e.g., at a certain frequency) or on demand (e.g., as data frames are received).

In some embodiments, the data frames may be part of a video stream. Thus, the video stream may include large frames (e.g., I-frames) and smaller frames (e.g., P-frames and/or B-frames). Thus, data optimization subsystem 118 may allocate radios according to frame sizes with the largest bandwidth radio or radios assigned to, for example, I-frames and the other two radios assigned to P-frames and B-frames. In some embodiments, the frames may be frames received from various types of recording devices. For example, frames may be infrared frames, sonar frames, or cloud points of lidar devices. Other recording devices or frames may be used with the disclosed embodiments. Thus, data optimization subsystem 118 may periodically assign, based on the corresponding frame size, a corresponding portion of the plurality of video frames of the video stream into a corresponding queue of a plurality of queues to be transmitted by each radio of the plurality of radios. As discussed above, each radio of the plurality of radios may have a corresponding queue of the plurality of queues.

In some instances, bandwidth values for radios may change so much over time that the bandwidth of the radio with the fastest connection may decrease so much that another radio may have a larger bandwidth. For example, as the uncrewed vehicle enters the non-transmit zone, radio 120 (FIG. 2) may have the bandwidth of one megabit per second while radio 130 (FIG. 2) may have seven megabits per second of bandwidth. However, at some point during travel through the non-transmit zone the changes in bandwidth may be so great that the queue may need to be reassigned. Data structure 220 of FIG. 2 illustrates the change. In particular, data structure 220 may represent updated data from data structure 200. Thus, field 223 stores radio identifiers, field 226 stores throughput numbers (e.g., bandwidth and/or latency) for each radio, and field 229 stores a corresponding queue identifier assigned to each radio.

As shown in FIG. 2, the queue identifiers in field 229 have been updated due to changes in bandwidth. Thus, data optimization subsystem 118 may, based on determining that a bandwidth ratio of bandwidth values or a latency ratio of latency values of two radios of the plurality of radios has changed by more than a threshold, switch queue assignments between two or more radios. FIG. 2 illustrates that Queue 1 and Queue 2 have been switched between radio 120 and radio 130. Data optimization subsystem 118 may be calculating bandwidth ratios and/or latency ratios periodically. For example, every time new bandwidth values and/or latency values are detected for various radios, data optimization subsystem 118 may calculate the ratios.

Data optimization subsystem 118 may perform the following operations to calculate the bandwidth ratios and/or latency ratios. As discussed above, link detection subsystem 116 may periodically detect each corresponding bandwidth value and/or each corresponding latency value for each radio. Thus, data optimization subsystem 118 may generate a set of bandwidth values and a set of latency values for each detection run. That is, every time network analysis is performed to determine bandwidth and/or latency values, data optimization subsystem 118 may generate a new set of values for bandwidth and/or latency. Data optimization subsystem 118 may store the generated values in memory. In some embodiments, data optimization subsystem 118 may store multiple sets of latest values (e.g., the last five sets, ten sets, etc.).

Data optimization subsystem 118 may then generate a corresponding bandwidth ratio for each radio of the plurality of radios with each other radio of the plurality of radios. For example, the uncrewed vehicle may have three different radios with each radio having its own bandwidth and/or latency value. Thus, data optimization subsystem 118 may create a ratio for each pair of radios (e.g., ratio for first and second radio, ratio for first and third radio, ratio for second and third radio). In some embodiments, data optimization subsystem 118 may generate the bandwidth ratios by dividing one bandwidth value (e.g., of a first radio) by another bandwidth value (e.g., of a second radio). Additionally or alternatively, data optimization subsystem 118 may generate latency ratios by dividing one latency value (e.g., of a first radio) by another latency value (e.g., of a second radio).

When the ratios have been generated, data optimization subsystem 118 may calculate a change value between the last ratio that was calculated and the currently calculated ratio to determine whether to switch the queues. In particular, data optimization subsystem 118 may calculate a change in the bandwidth ratio between each corresponding bandwidth ratio and a corresponding previous bandwidth ratio. For example, a currently calculated bandwidth ratio may be one-half and the last calculated bandwidth ratio may be two. Thus, data optimization subsystem 118 may determine that the ratios have changed sufficiently enough or greater than a threshold to switch the queues between the radios. A threshold may be set in various methods. For example, a threshold may be set in such a way as to determine when one radio has gained throughput (e.g., bandwidth and/or latency) to overtake another radio or overtake the other radio by a threshold value. In some embodiments, the threshold may be a value calculated based on the bandwidth and/or latency values.

FIG. 4 illustrates a data structure 400 for storing radio information and bandwidth ratio information. Fields 403 may store radio identifiers, while fields 406 may store corresponding network parameters, which may include bandwidth ratios between different radios. Fields 409 may store different changes in ratios based on new bandwidth and or latency information received from the radios. Data structure 400 may be updated periodically (e.g., when new bandwidth and/or latency data is received). The change in ratio numbers may be used to determine whether to reassign various queues to various radios.

Data optimization subsystem 118 may perform queue assignments using the following operations. Data optimization subsystem 118 may retrieve the threshold for determining whether to switch the queue assignments. The threshold may be a value stored within the memory of the uncrewed vehicle. Data optimization subsystem 118 may then compare the threshold with the change value. Based on determining that the change in the bandwidth ratio matches the threshold, data optimization subsystem 118 may tag a first queue associated with a first radio of the plurality of radios with a second identifier of a second radio of the plurality of radios and tag a second queue associated with the second radio of the plurality of radios with a first identifier of the first radio. That is, data optimization subsystem 118 may switch the queue identifier associated with the two radios.

In another example, the threshold may be designed in a way that each radio has an associated slot. For example, if there are three radios on board an uncrewed vehicle, there may be three spots. The spots may be assigned based on the bandwidth and/or latency of each radio. The fastest radio may be assigned to the top spot, the second fastest radio may be assigned to the second spot, and the slowest radio may be assigned to the third spot. As radios become faster or slower, data optimization subsystem 118 may adjust the placing of each radio. Alternatively or additionally, each queue may be assigned to a spot (e.g., fastest, medium, slowest). The largest frames may be added to the fastest queue, the medium frames may be added to the medium queue, and the smallest frames may be added to the slowest queue. Thus, when each radio becomes fastest, slowest, or medium (e.g., based on bandwidth and/or latency values), data optimization subsystem 118 may assign each radio to an appropriate queue.

In some embodiments, data optimization subsystem 118 may generate queues based on the number of radios within the uncrewed vehicle. In particular, data optimization subsystem 118 may detect a number of radios on board the vehicle. For example, each radio may be electronically or wirelessly connected to a processing unit on board an uncrewed vehicle. Thus, the computing device on board the uncrewed vehicle may detect each radio and determine the number of radios detected. Data optimization subsystem 118 may then generate the plurality of queues for storing the plurality of data frames. Each queue may be tagged with a tag of a corresponding radio. In some embodiments, the queues may not be initially tagged with the tag of each radio but may be tagged once the first bandwidth and/or latency detection operation is performed.

Alternatively or additionally, each queue may be tagged with a rank indicating an order associated with different data frame sizes (e.g., from largest data frame size to smallest data frame size). In some embodiments, each queue of the plurality of queues may be assigned a bandwidth range associated with a corresponding current bandwidth value of each radio of the plurality of radios. For example, a first queue may be assigned the range of zero megabits per second to one megabit per second, the second queue may be assigned the range of one megabit per second to five megabits per second, and a third radio may be assigned to five megabits per second and greater. In another example, each queue may be assigned a particular range of frame sizes in a similar manner.

Data optimization subsystem 118 may continue processing the received frame data and storing that frame data into the different queues until a non-transmit zone is exited (e.g., until the uncrewed vehicle enters a transmit zone). In response to detecting that the vehicle (e.g., an uncrewed vehicle) left the non-transmit zone, data optimization subsystem 118 may transmit the data frames from the plurality of queues. The transmission may be initiated while new data is saved into the queues until the queues are emptied. That is, data optimization subsystem 118 may access each queue and start sending the data frames (e.g., video frames) in each queue. In one example, where the data frames are video frames, data optimization subsystem 118 may have a queue dedicated to I-frames, another queue dedicated to P-frames and another queue dedicated to B-frames. In some embodiments, the P-frames, and the B-frames may be mixed in the same queue, but the assignment may be based on the size of the frames. Thus, in response to detecting that the uncrewed aerial vehicle left the non-transmit zone, data optimization subsystem 118 may initiate transmission of video frames from the plurality of queues over the plurality of radios. As discussed above, each frame may be transmitted over a corresponding radio based on queue assignment.

In some embodiments, data optimization subsystem 118 may optimize how much data is stored based on velocity of the vehicle and remaining storage space for storing data (e.g., frame data). To perform the optimization, data optimization subsystem 118 may periodically determine a velocity associated with the uncrewed vehicle. For example, the device hosting data optimization subsystem 118 may be receiving velocity data (e.g., speed and/or direction) from a vehicle that is hosting data optimization subsystem 118. In some embodiments, data optimization subsystem 118 may be equipped with a device that is able to measure speed and/or acceleration of the vehicle (e.g., the uncrewed vehicle). Data optimization subsystem 118 may use other mechanisms to periodically determine the velocity associated with the vehicle (e.g., an uncrewed vehicle). It should be noted that this mechanism may be deployed in other scenarios. For example, an operator may be carrying a device hosting the transmission optimization system. Alternatively, the transmission optimization system may be mounted onto a vehicle (e.g., crewed or uncrewed). The vehicle may be aerial, land, marine, etc.

In some embodiments, data optimization subsystem 118 may use machine learning to determine one or more mechanisms to optimize how the frames are processed and stored. Data optimization subsystem 118 may determine, based on a velocity of the vehicle (e.g., as described above), that the data stream is predicted to fill up storage space on board the vehicle. For example, data optimization subsystem 118 may access the total value of storage memory remaining on board the uncrewed vehicle. Furthermore, data optimization subsystem 118 may determine a rate that the memory is being filled by the recording process. Based on that data, data optimization subsystem 118 may determine an amount of time that it will take to fill up the storage space. Data optimization subsystem 118 may then determine, based on the velocity of the vehicle and mapping and/or global positioning system (GPS) available to data optimization subsystem 118, the amount of time it will take traverse the non-transmit zone. Thus, based on the traverse time and the amount of time it takes to fill up the storage space, data optimization subsystem 118 may determine that that the storage space will run out prior to reaching a transmit zone.

Based on determining that the data stream is predicted to fill up the storage space on board the vehicle prior to reaching a transmit zone, data optimization subsystem 118 may determine to use a machine learning model for each data frame of the data stream, whether each data frame of the data stream includes one or more objects of interest identified in a mission plan. That is, data optimization subsystem 118 may use a machine learning model on board the vehicle to identify objects of interest within the frames. Based on determining that a first subset of frames within the data stream includes the one or more objects of interest, data optimization subsystem 118 may save the first subset of frames. That is, if there are objects of interest as determined by the machine learning model, the frames having those objects of interest may be saved. Objects of interests may be defined in a mission plan or in another data structure available to data optimization subsystem 118. Based on determining that a second subset of frames within the data stream does not include the one or more objects of interest, data optimization subsystem 118 may delete the second subset of frames.

As discussed above, data optimization subsystem 118 may use a machine learning model to determine which data frames to delete and which data frames to save to be transmitted when the vehicle (e.g., an uncrewed vehicle)

enters a transmit zone. The machine learning model may have been one that was trained on images of the objects of interests. In some embodiments, data optimization subsystem 118 may use machine learning to distribute frames into queues based on frame size and queue properties (e.g., size of the queues, number of frames already in the queues, and/or other data). Thus, data optimization subsystem 118 may determine the optimal way to allocate frames between different queues based on the bandwidth and/or latency associated with each queue's corresponding radio. This may ensure efficient use of available bandwidth and may minimize transmission delays. This mechanism may enhance the reliability and speed of data transmission by leveraging multiple network paths and frequencies. For example, the machine learning model may be trained, for example, using labeled data. The machine learning model may take, as input, a plurality of bandwidth or throughput values (e.g., for each radio) and a plurality of frame identifiers with frame sizes. Based on that information, the machine learning model may output a corresponding group of frames for each radio.

In some embodiments, the machine learning model may be trained based on optimized loads for different numbers of radios and different throughput/bandwidth values. In some embodiments, in addition to or instead of the bandwidth values, the machine learning model may use latency values to output groupings of frames for the radios. Thus, a training routine of the machine learning model may access a dataset that includes training data for training the machine learning model. The training data may include various bandwidth and/or latency values and various optimization outcomes for different numbers of radios. The training routine of the machine learning model may ingest the training data and train the machine learning model based on the training data.

Figure 3:
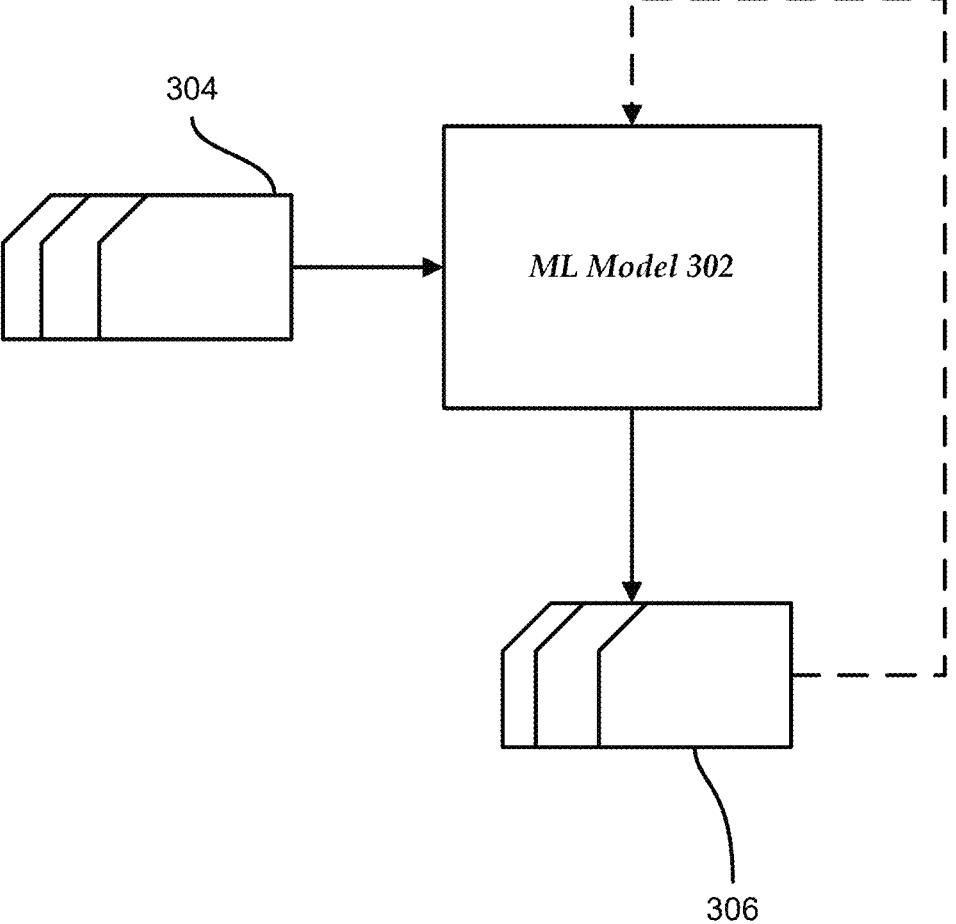
FIG. 3 illustrates an exemplary machine learning model, in accordance with one or more embodiments of this disclosure.

The machine learning model used in connection with this disclosure may take many forms. FIG. 3 illustrates an exemplary machine learning model. Machine learning model 302 may take input 304 (e.g., one or more queue identifiers with bandwidth and/or latency values for the corresponding radios together with frame identifiers and frame sizes for frames) and may output 306 groups of frames to be assigned to particular queues. The output parameters may be fed back to the machine learning model as input to train or retrain the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem-solving as compared to computer programs that do not use machine learning. During training, an output layer of the machine learning model may correspond to a classification of the machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a nonlinear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, as discussed above, transmission optimization system 102 may use a machine learning model to identify objects of interest within the data stream. For example, the machine learning model may be trained using labeled data to identify objects such as tanks, artillery, helicopters, and/or other suitable military objects. The machine learning model may be any model as described above. For example, the machine learning model may be a neural network or another suitable model.

In some embodiments, the objects of interest may be stored as part of a mission plan. One example may include military objects such as tanks, artillery, etc. Thus, transmission optimization system 102 may retrieve those criteria from the mission plan and perform object detection. Accordingly, transmission optimization system 102 may identify objects of interest in the data frames. In particular, transmission optimization system 102 may, based on determining that the first portion of the data stream includes the one or more objects identified in the mission plan, save the first portion of the data stream for transmission when the recording device reaches a transmission zone. For example, the transmission optimization system 102 may detect a tank or an artillery installation within a video stream that was recorded while an uncrewed aerial vehicle was flying within the non-transmit zone. Accordingly, transmission optimization system 102 may save and store that footage for transmission when a transmit zone is reached.

In some embodiments, transmission optimization system 102 may instruct the vehicle (e.g., an uncrewed vehicle) to change velocity based on rate of storage fill. For example, transmission optimization system 102 may determine, based on a velocity of the vehicle, that the data stream is predicted to fill up storage space on board the vehicle before the non-transmit zone is exited by the vehicle. As discussed above, transmission optimization system 102 may determine how long it will take to fill up the memory based on rate of recording of the data frames and how fast those data frames take up storage space. Thus, transmission optimization system 102 may, based on determining that the data stream is predicted to fill up the storage space on board the vehicle, increase a speed of the vehicle based on how fast the storage space is predicted to fill up. That is, transmission optimization system 102 may increase the speed of the vehicle and/or change direction of the vehicle so that the vehicle exits the non-transmit zone prior to storage space running out.

Computing Environment

Figure 5:
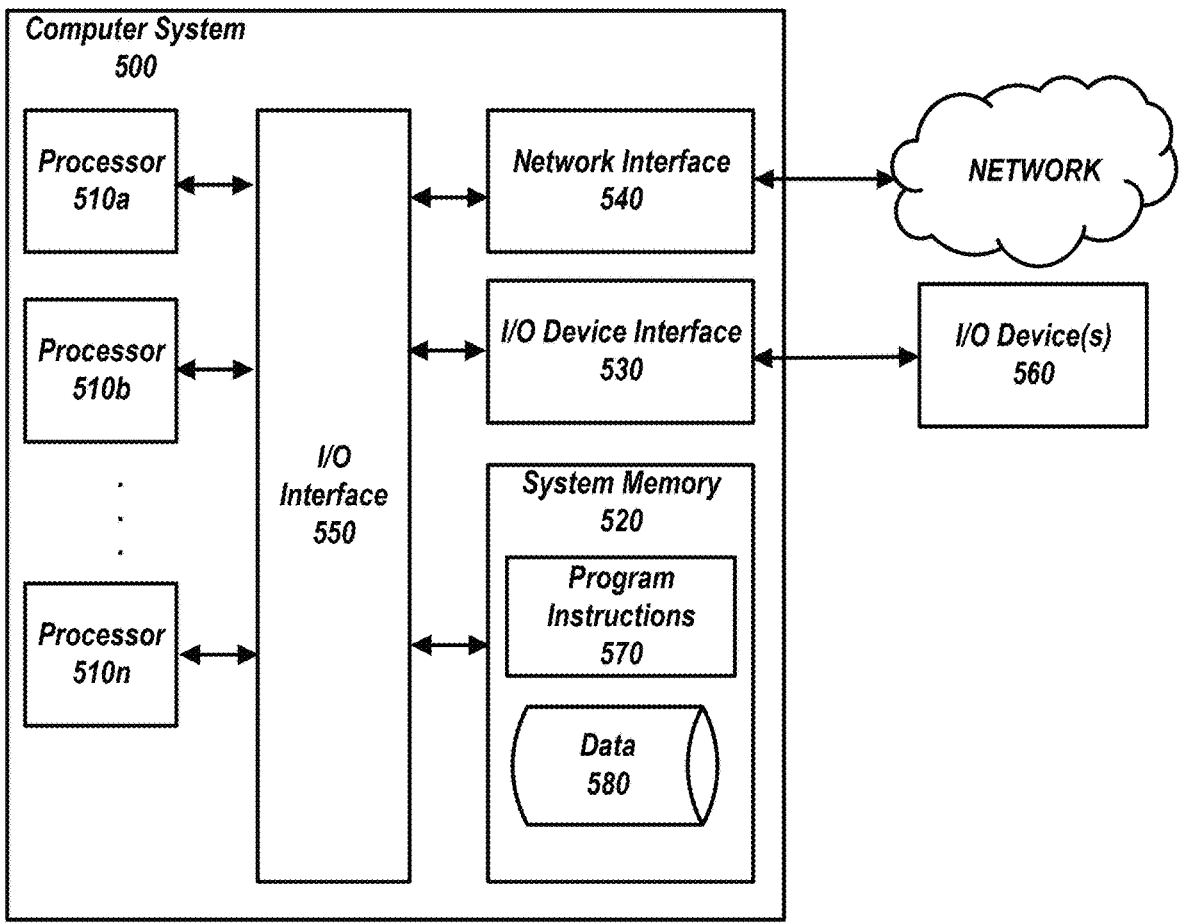
FIG. 5 illustrates a computing device, in accordance with one or more embodiments of this disclosure.

FIG. 5 shows an example computing system that may be used in accordance with some embodiments of this disclosure. In some instances, computing system 500 is referred to as a computer system. The computing system may be hosted on a device (e.g., a smartphone, a tablet, or another suitable device) that an operator may control. In some embodiments, the computing system may be hosted on a server at a datacenter. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special-purpose microprocessors. A processor may receive instructions and data from a memory (e.g., system memory 520). Computing system 500 may be a uni-processor system including one processor (e.g., processor 510a) or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special-purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a LAN, a WAN, a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include one or more non-transitory, computer-readable storage media. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static RAM (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a GPS, or the like. Computer system 500 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided or other additional functionality may be available.

Operation Flow

FIG. 6 is a flowchart 600 of operations for optimizing transmission of data. The operations of FIG. 6 may use components described in relation to FIG. 5. In some embodiments, transmission optimization system 102 may include one or more components of computing system 500. At 602, transmission optimization system 102 records a data stream on board a vehicle. For example, transmission optimization system 102 may receive a video stream from recording device 108 (e.g., a video camera mounted onto an uncrewed aerial vehicle). Transmission optimization system 102 may receive the video stream using I/O device interface 530. In some embodiments, transmission optimization system 102 may receive the data stream using network interface 540.

At 604, transmission optimization system 102 detects that the vehicle has crossed into a non-transmit zone. For example, transmission optimization system 102 may use one or more processors 510a, 510b, and/or 510n to perform the detection. At 606, transmission optimization system 102 periodically determines, for each radio, a corresponding bandwidth (and/or latency) for transmitting data to a remote device. For example, transmission optimization system 102 may use one or more processors 510*a*-510*n* to perform the determination. In some embodiments, transmission optimization system 102 may use I/O device interface 530 to request coordinates (e.g., from a GPS device) to perform the determination.

At 608, transmission optimization system 102 periodically assigns a corresponding portion of the plurality of data frames into a corresponding queue. Transmission optimization system 102 may perform this operation using one or more processors 510*a*, 510*b*, and/or 510*n*. At 610, transmission optimization system 102, based on determining that a bandwidth ratio of two radios has changed by more than a threshold, switches queue assignments between the two radios. Transmission optimization system 102 may use one or more processors 510*a*, 510*b*, and/or 510*n* to instruct the radios to transmit the data frames. The data frames may be stored in system memory 520 separated into different buckets/queues for different radios. At 612, transmission optimization system 102, based on detecting that the vehicle left the non-transmit zone, transmits data frames from the plurality of queues. Transmission optimization system 102 may perform this operation using one or more processors 510*a*, 510*b*, and/or 510*n*. For example, transmission optimization system 102 may instruct all radios to start transmitting frame data from the queues.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: recording a data stream on board a vehicle, wherein the data stream comprises a plurality of data frames; detecting that the vehicle has crossed into a non-transmit zone, wherein the non-transmit zone is a predetermined zone where data transmission is to be terminated; periodically determining, for each radio of a plurality of radios while within the non-transmit zone, a corresponding bandwidth value or a corresponding latency value for transmitting data to a remote device; periodically assigning, based on a corresponding frame size, a corresponding portion of the plurality of data frames of the data stream into a corresponding queue of a plurality of queues to be transmitted by each radio of the plurality of radios, wherein each radio of the plurality of radios has a corresponding queue of the plurality of queues; based on determining that a bandwidth ratio of bandwidth values or a latency ratio of latency values of two radios of the plurality of radios has changed by more than a threshold, switching queue assignments between the two radios; and in response to detecting that the vehicle left the non-transmit zone, transmitting data frames from the plurality of queues.

2. Any of the preceding embodiments, further comprising: periodically detecting each corresponding bandwidth value and each corresponding latency value to generate a set of bandwidth values and a set of latency values; generating a corresponding bandwidth ratio for each radio of the plurality of radios with each other radio of the plurality of radios; and calculating a change in the bandwidth ratio between each corresponding bandwidth ratio and a corresponding previous bandwidth ratio.

3. Any of the preceding embodiments, wherein switching the queue assignments between the two radios further comprises: retrieving the threshold for determining whether to switch the queue assignments; and based on determining that the change in the bandwidth ratio matches the threshold, tagging a first queue associated with a first radio of the plurality of radios with a second identifier of a second radio of the plurality of radios and tagging a second queue associated with the second radio of the plurality of radios with a first identifier of the first radio.

4. Any of the preceding embodiments, further comprising: determining, based on a velocity of the vehicle, that the data stream is predicted to fill up storage space on board the vehicle; based on determining that the data stream is predicted to fill up the storage space on board the vehicle, determining to use a machine learning model for each data frame of the data stream, whether each data frame of the data stream includes one or more objects of interest identified in a mission plan; based on determining that a first subset of frames within the data stream includes the one or more objects of interest, saving the first subset of frames; and based on determining that a second subset of frames within the data stream does not include the one or more objects of interest, deleting the second subset of frames.

5. Any of the preceding embodiments, further comprising: determining, based on a velocity of the vehicle, that the data stream is predicted to fill up storage space on board the vehicle; and based on determining that the data stream is predicted to fill up the storage space on board the vehicle, increasing a speed of the vehicle based on how fast the storage space is predicted to fill up.

6. Any of the proceeding embodiments, further comprising: detecting a number of radios on board the vehicle; and generating the plurality of queues for storing the plurality of data frames, wherein each queue is tagged with a tag of a corresponding radio.

7. Any of the preceding embodiments, wherein each queue of the plurality of queues is assigned a bandwidth range associated with a corresponding current bandwidth value associated with each radio of the plurality of radios.

8. One or more tangible, non-transitory, machine-readable media storing instructions that, when executed by a data processing apparatus, cause the data processing apparatus to perform operations comprising those of any of embodiments 1-7.

9. A system comprising: one or more processors; and memory storing instructions that, when executed by the processors, cause the processors to effectuate operations comprising those of any of embodiments 1-7.

10. A system comprising means for performing any of embodiments 1-7.

What is claimed is:

1. A system for optimizing transmission of video data, the system comprising:

one or more processors; and one or more non-transitory, computer-readable storage media storing instructions, which when executed by the one or more processors cause the one or more processors to perform operations comprising:

detecting, at an uncrewed aerial vehicle, that the uncrewed aerial vehicle has crossed into a non-transmit zone, wherein the non-transmit zone is a predetermined zone where data transmission is to be terminated;

in response to determining that the uncrewed aerial vehicle has crossed into the non-transmit zone:

terminating the data transmission and continuously processing a video stream being recorded as the uncrewed aerial vehicle moves within the non-transmit zone, wherein the video stream comprises a plurality of video frames with each frame having a corresponding frame size;

periodically determining, for each radio of a plurality of radios while within the non-transmit zone, a corresponding bandwidth value and a corresponding latency value for transmitting data to a remote device;

periodically assigning, based on the corresponding frame size, a corresponding portion of the plurality of video frames of the video stream into a corresponding queue of a plurality of queues to be transmitted by each radio of the plurality of radios, wherein each radio of the plurality of radios has a corresponding queue of the plurality of queues; and based on determining that a bandwidth ratio of bandwidth values or a latency ratio of latency values of two radios of the plurality of radios has changed by more than a threshold, switching queue assignments between the two radios; and in response to detecting that the uncrewed aerial vehicle left the non-transmit zone, initiating transmission of video frames from the plurality of queues over the plurality of radios, wherein each frame is transmitted over a corresponding radio based on queue assignment.

2. The system of claim 1, wherein the instructions further cause the one or more processors to perform operations comprising:

determining, based on a velocity of the uncrewed aerial vehicle, that the video stream is predicted to fill up storage space on board the uncrewed aerial vehicle;

based on determining that the video stream is predicted to fill up the storage space on board the uncrewed aerial vehicle, determining, using a machine learning model for each frame of the video stream, whether each frame of the video stream includes one or more objects of interest identified in a mission plan;

based on determining that a first subset of frames within the video stream includes the one or more objects of interest, saving the first subset of frames for transmission when the uncrewed aerial vehicle reaches a transmit zone; and based on determining that a second subset of frames within the video stream does not include the one or more objects of interest, deleting the second subset of frames.

3. The system of claim 1, wherein the instructions further cause the one or more processors to perform operations comprising:

periodically detecting each corresponding bandwidth value and each corresponding latency value to generate a set of bandwidth values and a set of latency values;

generating a corresponding bandwidth ratio for each radio of the plurality of radios with each other radio of the plurality of radios; and calculating a change in the bandwidth ratio between each corresponding bandwidth ratio and a corresponding previous bandwidth ratio.

4. The system of claim 3, wherein the instructions for switching the queue assignments between the two radios further cause the one or more processors to perform operations comprising:

retrieving the threshold for determining whether to switch the queue assignments; and based on determining that the change in the bandwidth ratio matches the threshold, tagging a first queue associated with a first radio of the plurality of radios with a second identifier of a second radio of the plurality of radios and tagging a second queue associated with the second radio of the plurality of radios with a first identifier of the first radio.

5. The system of claim 1, wherein the instructions further cause the one or more processors to perform operations comprising:

determining, based on a velocity of the uncrewed aerial vehicle, that the video stream is predicted to fill up storage space on board the uncrewed aerial vehicle; and based on determining that the video stream is predicted to fill up the storage space on board the uncrewed aerial vehicle, increasing a speed of the uncrewed aerial vehicle based on how fast the storage space is predicted to fill up.

6. The system of claim 1, wherein the instructions further cause the one or more processors to perform operations comprising:

detecting a number of radios on board the uncrewed aerial vehicle; and generating the plurality of queues for storing the plurality of video frames, wherein each queue is tagged with a tag of the corresponding radio.

7. The system of claim 6, wherein each queue of the plurality of queues is assigned a bandwidth range associated with a corresponding current bandwidth value associated with each radio of the plurality of radios.

8. A method comprising:

recording a data stream on board a vehicle, wherein the data stream comprises a plurality of data frames;

detecting that the vehicle has crossed into a non-transmit zone, wherein the non-transmit zone is a predetermined zone where data transmission is to be terminated;

periodically determining, for each radio of a plurality of radios while within the non-transmit zone, a corresponding bandwidth value or a corresponding latency value for transmitting data to a remote device;

periodically assigning, based on a corresponding frame size, a corresponding portion of the plurality of data frames of the data stream into a corresponding queue of a plurality of queues to be transmitted by each radio of the plurality of radios, wherein each radio of the plurality of radios has a corresponding queue of the plurality of queues;

based on determining that a bandwidth ratio of bandwidth values or a latency ratio of latency values of two radios of the plurality of radios has changed by more than a threshold, switching queue assignments between the two radios; and in response to detecting that the vehicle left the non-transmit zone, transmitting data frames from the plurality of queues.

9. The method of claim 8, further comprising:

periodically detecting each corresponding bandwidth value and each corresponding latency value to generate a set of bandwidth values and a set of latency values;

generating a corresponding bandwidth ratio for each radio of the plurality of radios with each other radio of the plurality of radios; and calculating a change in the bandwidth ratio between each corresponding bandwidth ratio and a corresponding previous bandwidth ratio.

10. The method of claim 9, wherein switching the queue assignments between the two radios further comprises:

retrieving the threshold for determining whether to switch the queue assignments; and based on determining that the change in the bandwidth ratio matches the threshold, tagging a first queue associated with a first radio of the plurality of radios with a second identifier of a second radio of the plurality of radios and tagging a second queue associated with the second radio of the plurality of radios with a first identifier of the first radio.

11. The method of claim 8, further comprising:

determining, based on a velocity of the vehicle, that the data stream is predicted to fill up storage space on board the vehicle;

based on determining that the data stream is predicted to fill up the storage space on board the vehicle, determining, using a machine learning model for each data frame of the data stream, whether each data frame of the data stream includes one or more objects of interest identified in a mission plan;

based on determining that a first subset of frames within the data stream includes the one or more objects of interest, saving the first subset of frames; and based on determining that a second subset of frames within the data stream does not include the one or more objects of interest, deleting the second subset of frames.

12. The method of claim 8, further comprising:

determining, based on a velocity of the vehicle, that the data stream is predicted to fill up storage space on board the vehicle; and based on determining that the data stream is predicted to fill up the storage space on board the vehicle, increasing a speed of the vehicle based on how fast the storage space is predicted to fill up.

13. The method of claim 8, further comprising:

detecting a number of radios on board the vehicle; and generating the plurality of queues for storing the plurality of data frames, wherein each queue is tagged with a tag of a corresponding radio.

14. The method of claim 13, wherein each queue of the plurality of queues is assigned a bandwidth range associated with a corresponding current bandwidth value associated with each radio of the plurality of radios.

15. One or more non-transitory, computer-readable media storing instructions thereon, wherein the instructions cause one or more processors to perform operations comprising:

recording a data stream on board a vehicle, wherein the data stream comprises a plurality of data frames;

detecting that the vehicle has crossed into a non-transmit zone, wherein the non-transmit zone is a predetermined zone where data transmission is to be terminated;

periodically determining, for each radio of a plurality of radios while within the non-transmit zone, a corresponding bandwidth value or a corresponding latency value for transmitting data to a remote device;

periodically assigning, based on a corresponding frame size, a corresponding portion of the plurality of data frames of the data stream into a corresponding queue of a plurality of queues to be transmitted by each radio of the plurality of radios, wherein each radio of the plurality of radios has a corresponding queue of the plurality of queues;

based on determining that a bandwidth ratio of bandwidth values or a latency ratio of latency values of two radios of the plurality of radios has changed by more than a threshold, switching queue assignments between the two radios; and in response to detecting that the vehicle left the non-transmit zone, transmitting data frames from the plurality of queues.

16. The one or more non-transitory, computer-readable media of claim 15, wherein the instructions further cause the one or more processors to perform operations comprising:

periodically detecting each corresponding bandwidth value and each corresponding latency value to generate a set of bandwidth values and a set of latency values;

generating a corresponding bandwidth ratio for each radio of the plurality of radios with each other radio of the plurality of radios; and calculating a change in the bandwidth ratio between each corresponding bandwidth ratio and a corresponding previous bandwidth ratio.

17. The one or more non-transitory, computer-readable media of claim 16, wherein the instructions for switching the queue assignments between the two radios further cause the one or more processors to perform operations comprising:

retrieving the threshold for determining whether to switch the queue assignments; and based on determining that the change in the bandwidth ratio matches the threshold, tagging a first queue associated with a first radio of the plurality of radios with a second identifier of a second radio of the plurality of radios and tagging a second queue associated with the second radio of the plurality of radios with a first identifier of the first radio.

18. The one or more non-transitory, computer-readable media of claim 15, wherein the instructions further cause the one or more processors to perform operations comprising:

detecting a number of radios on board the vehicle; and generating the plurality of queues for storing the plurality of data frames, wherein each queue is tagged with a tag of a corresponding radio.

19. The one or more non-transitory, computer-readable media of claim 15, wherein the instructions further cause the one or more processors to perform operations comprising:

determining, based on a velocity of the vehicle, that the data stream is predicted to fill up storage space on board the vehicle;

based on determining that the data stream is predicted to fill up the storage space on board the vehicle, determining, using a machine learning model for each data frame of the data stream, whether each data frame of the data stream includes one or more objects of interest identified in a mission plan;

based on determining that a first subset of frames within the data stream includes the one or more objects of interest, saving the first subset of frames; and based on determining that a second subset of frames within the data stream does not include the one or more objects of interest, deleting the second subset of frames.

20. The one or more non-transitory, computer-readable media of claim 15, wherein the instructions further cause the one or more processors to perform operations comprising:

determining, based on a velocity of the vehicle, that the data stream is predicted to fill up storage space on board the vehicle; and based on determining that the data stream is predicted to fill up the storage space on board the vehicle, increasing a speed of the vehicle based on how fast the storage space is predicted to fill up.

* * * * *